(12) United States Patent  
Tao

(10) Patent No.: US 8,746,021 B2  
(45) Date of Patent: Jun. 10, 2014

(54) RETRACTABLE CABLE LOCK ASSEMBLY FOR LAPTOP COMPUTERS

(71) Applicant: Ruipeng Tao, Sunnyvale, CA (US)

(72) Inventor: Ruipeng Tao, Sunnyvale, CA (US)

( * ) Notice: Subject to any disclaimer, the term of this patent is extended or adjusted under 35 U.S.C. 154(b) by 0 days.

(21) Appl. No.: 13/658,321

(22) Filed: Oct. 23, 2012

(65) Prior Publication Data

US 2014/0109630 A1    Apr. 24, 2014

(51) Int. Cl.  
*E05B 73/00*     (2006.01)

(52) U.S. Cl.  
USPC ..................................... 70/58; 70/30; 70/304

(58) Field of Classification Search  
USPC ........ 70/30, 57, 57.1, 58, 301, 302, 304–306, 70/312  
See application file for complete search history.

(56) References Cited

U.S. PATENT DOCUMENTS

| | | | | | |
|---|---|---|---|---|---|
| 3,670,535 | A | * | 6/1972 | Stettner et al. | 70/58 |
| 4,198,837 | A | * | 4/1980 | Gisiger | 70/71 |
| 5,868,012 | A | * | 2/1999 | Chun-Te et al. | 70/30 |
| 6,363,757 | B1 | * | 4/2002 | Yu | 70/28 |
| 7,549,308 | B2 | * | 6/2009 | Avganim | 70/58 |
| 7,581,417 | B1 | * | 9/2009 | Chen | 70/57 |
| 8,074,478 | B1 | * | 12/2011 | Shu | 70/58 |
| 2004/0093916 | A1 | * | 5/2004 | Ling | 70/58 |
| 2005/0223756 | A1 | * | 10/2005 | Ling et al. | 70/30 |
| 2007/0245777 | A1 | * | 10/2007 | Miao | 70/58 |
| 2007/0277566 | A1 | * | 12/2007 | Yu | 70/58 |

* cited by examiner

*Primary Examiner* — Christopher Boswell  
(74) *Attorney, Agent, or Firm* — Oakwood Law Group, LLP; Stephen Liu

(57) ABSTRACT

A retractable cable combination lock assembly according to the present invention can protect the newly designed Macbook pro with retina display and Macbook Air series and traditional computer with or without Kensington lock slot from theft by securing the laptop via the thunderbolt slot to an immovable object such as a piece of furniture. The lock assembly of the present invention can also be designed to plug into the USB port or HDMI port of Macbook Pro with Retina display, Macbook Air laptop series, and traditional computers with or without Kensington lock slot to lock the computer rather than using thunderbolt port.

5 Claims, 12 Drawing Sheets

RETRACTABLE CABLE LOCK ASSEMBLY FOR LAPTOP COMPUTERS

BACKGROUND OF THE INVENTION

1. Field of the Invention

This invention relates generally to a lock assembly for laptop computers and, relates more particularly to a retractable combination cable lock that can plug into a built-in hole (such as a thunderbolt slot, USB port, or HDMI port) on the frame of laptop computers (especially those that do not have a specifically drilled Kensington lock slot) with the other end securely attached to an immovable object such as a desk or chair.

2. Description of Related Art

Traditional laptops have a specially drilled Kensington lock slot. They can be protected by attaching a Kensington laptop lock to the Kensington lock slot of the computer and with the other end attached to an immovable object such as a desk or chair.

However, Macbook Air and Macbook Pro with retina display series do not come with Kensington lock slot. Therefore, they cannot be protected by any laptop locks currently available in the marketplace. With the exception of the Maclock designed lock case bundle which screws a case at the bottom of the laptop and attach Kensington lock to the case; this makes the thin laptop look less aesthetically pleasing and heavier. Furthermore, the plastic case is easy to break.

Therefore, it is desirable to have a lock assembly that can protect Macbook Air and Macbook Pro with retina display series from theft.

SUMMARY OF THE INVENTION

In an exemplary embodiment of the present invention, there is disclosed a lock assembly that can protect the newly designed Macbook pro with retina display and Macbook Air series from being stolen (theft) by securing the laptop via a built-in slot on the frame of a computer to an immovable item such as a desk or chair.

The lock assembly of the present invention is a slim combination lock that can be attached and locked into a thunderbolt slot or USB port or HDMI port on the frame of a computer.

A combination laptop lock according to the present invention is slim, pretty, intuitive and easy to use.

Furthermore, compared to other laptop locks that are long and inconvenient to carry, the specially designed retractable mechanism and case can store the lock and cable in a way so that the whole lock can be carried like a wallet.

A retractable cable combination lock assembly for laptop computers according to the present invention comprises a combination lock having a hook that can be hooked up to the frame of a computer via a built-in hole in the frame of the computer; a retractable cable having one end securely connected to said lock and being used to secure the laptop to an immovable object such as a piece of furniture; and a case with retractable mechanism for retracting, storing and carrying said retractable cable and lock, said cable having the other end attached to said case; wherein the built-in hole is a thunderbolt slot, USB port, or HDMI port.

The lock assembly can be used to lock both the laptop with Kensington Lock slot and the laptop without Kensington lock slot via a thunderbolt slot, USB port, or HDMI port rather than the Kensington lock slot.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
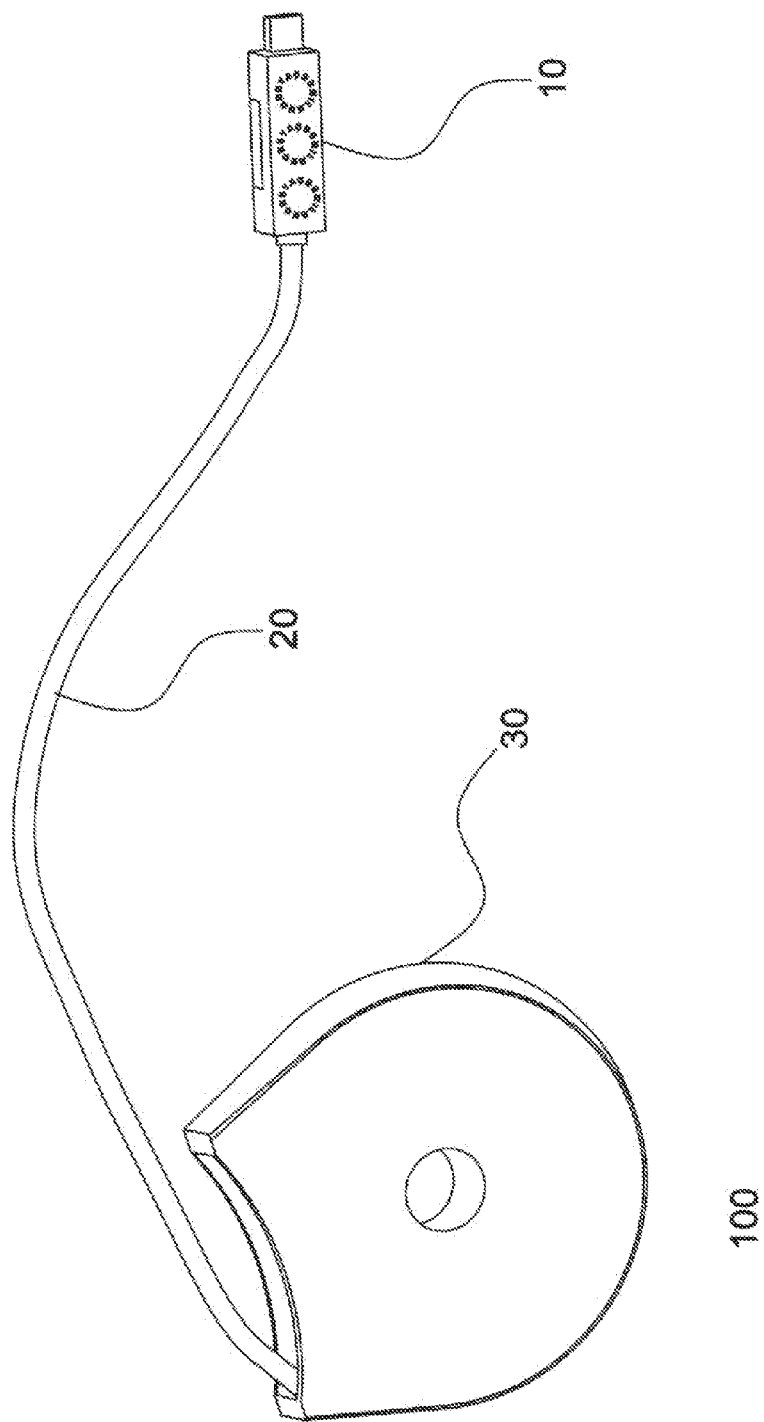
FIG. 1 is a perspective view of a lock assembly for a laptop computer in accordance with the present invention showing a condition when the lock 10 and cable 20 are pulled out of the case 30.
Figure 2:
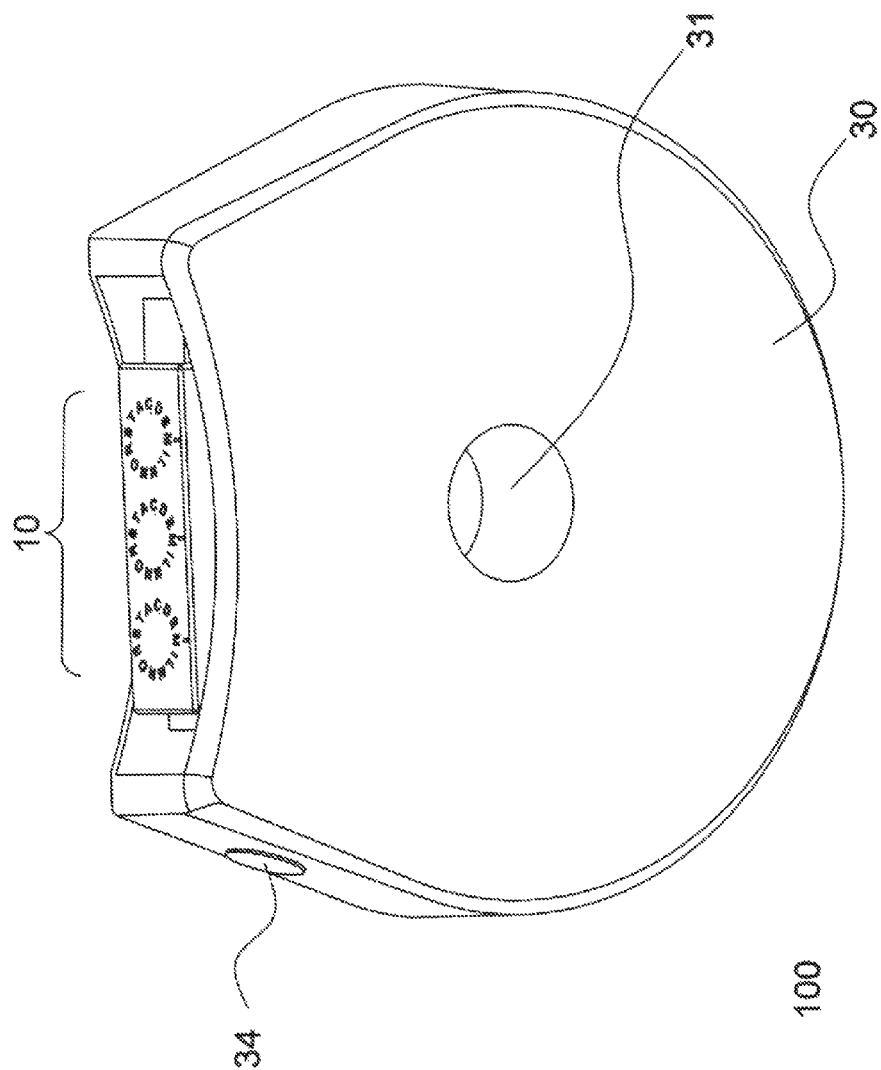
FIG. 2 is a perspective view of the lock assembly for the laptop computer showing a condition when the lock 10 and cable 20 are retracted and stored inside the case 30 for easy storing and carrying.

Referring to FIGS. 1 and 2, there is disclosed a cable combination lock assembly for a laptop computer according to the present invention. The combination lock assembly ("lock assembly" hereinafter) is generally designated as 100 comprising a lock 10, a cable 20 which is connected to the lock head 10, and a specially designed retractable mechanism and case 30 which can store the lock 10 and cable 20 in a way that the whole lock can be carried like a wallet. FIG. 1 is a perspective view of the lock assembly at a condition when the lock 10 is pulled out of the case 30 for use and FIG. 2 is a perspective view of when the lock 10 and cable 20 is stored inside the case 30 for easy stowing and carrying.

Figure 3:
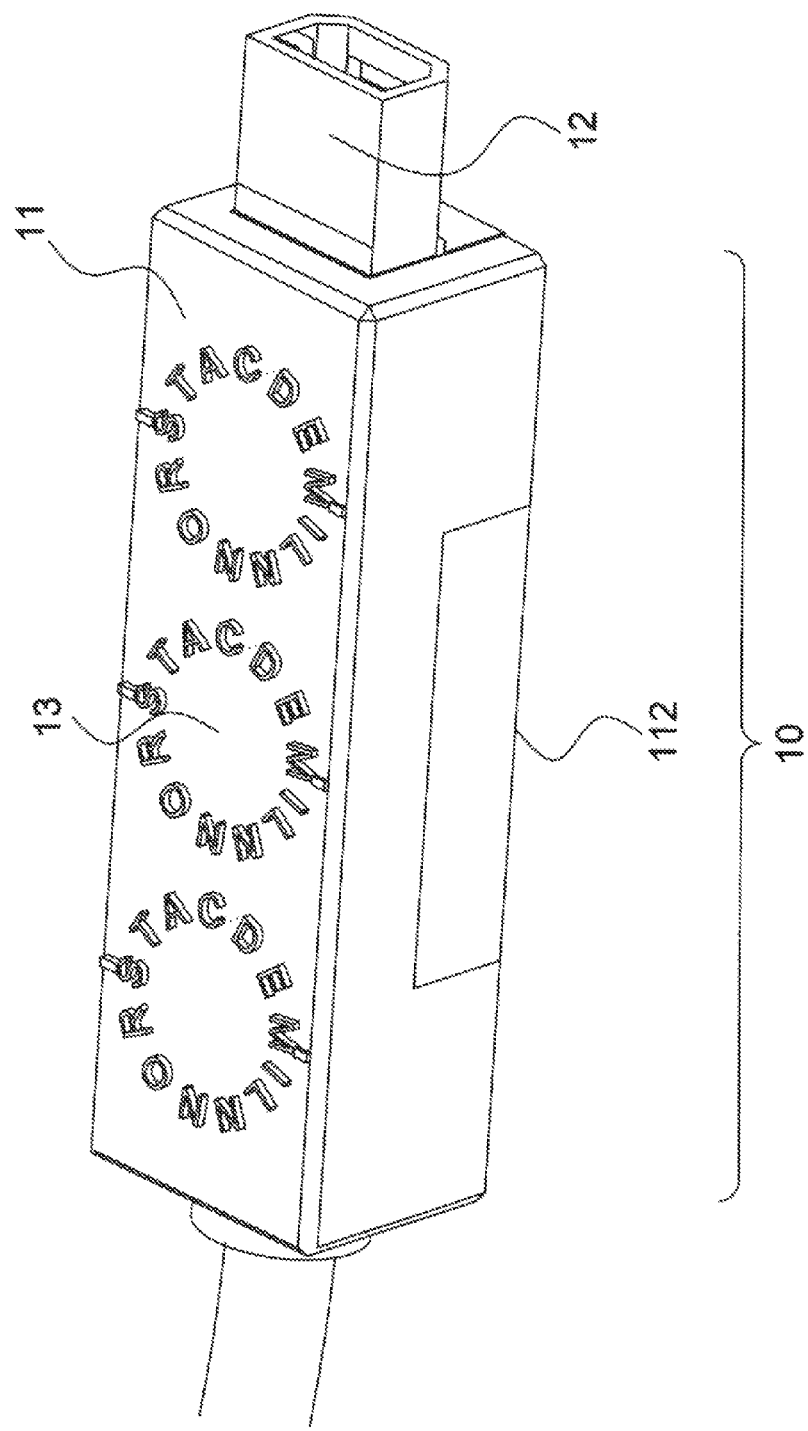
FIG. 3 is a perspective isometric view of the lock head 10 for the laptop computer.
Figure 4:
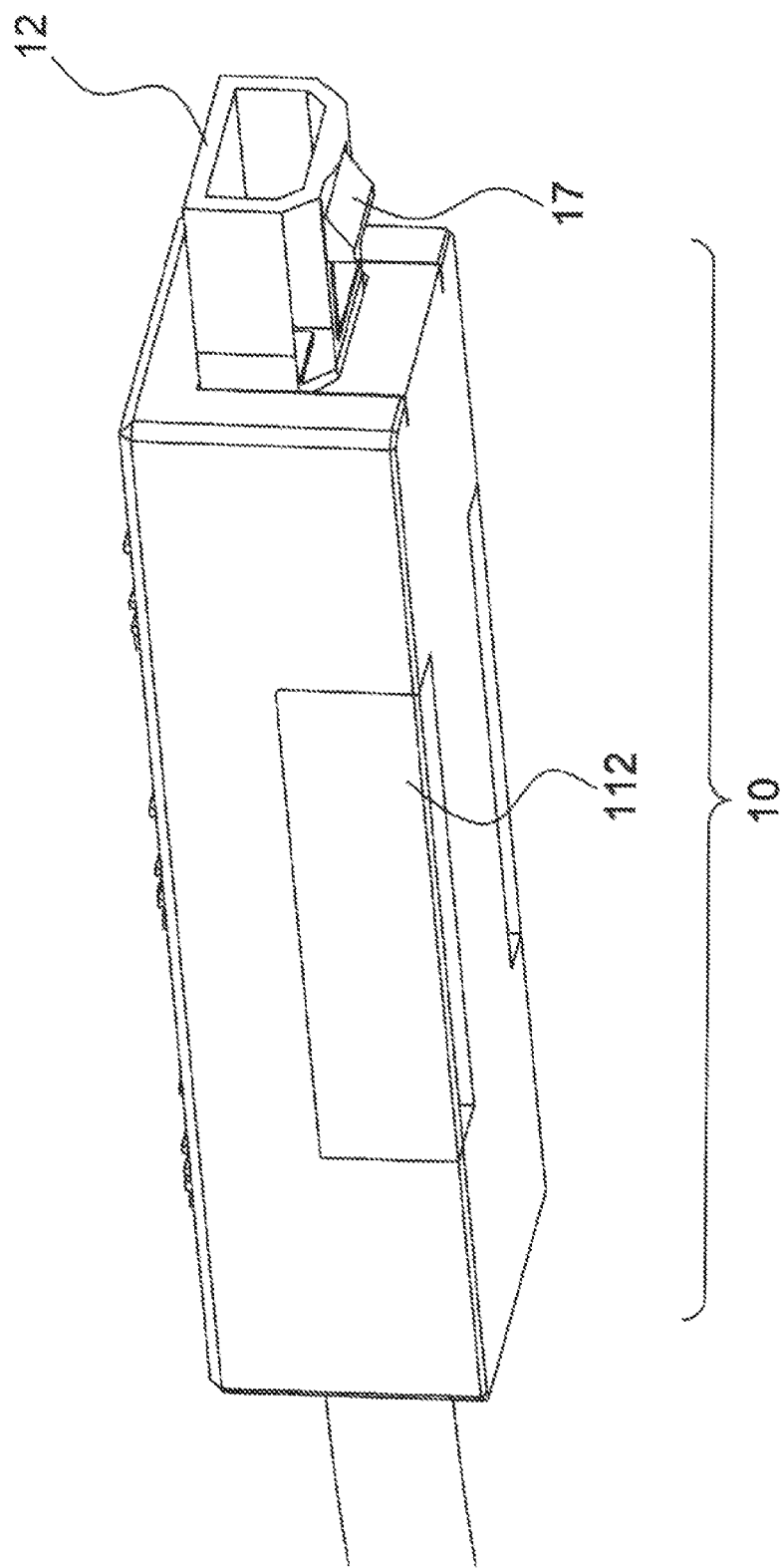
FIG. 4 is a perspective isometric view of the lock head 10 wherein the hook 17 is projected outside the lock's plug head 12 to hook up with the thunderbolt slot of a laptop (not shown).
Figure 5:
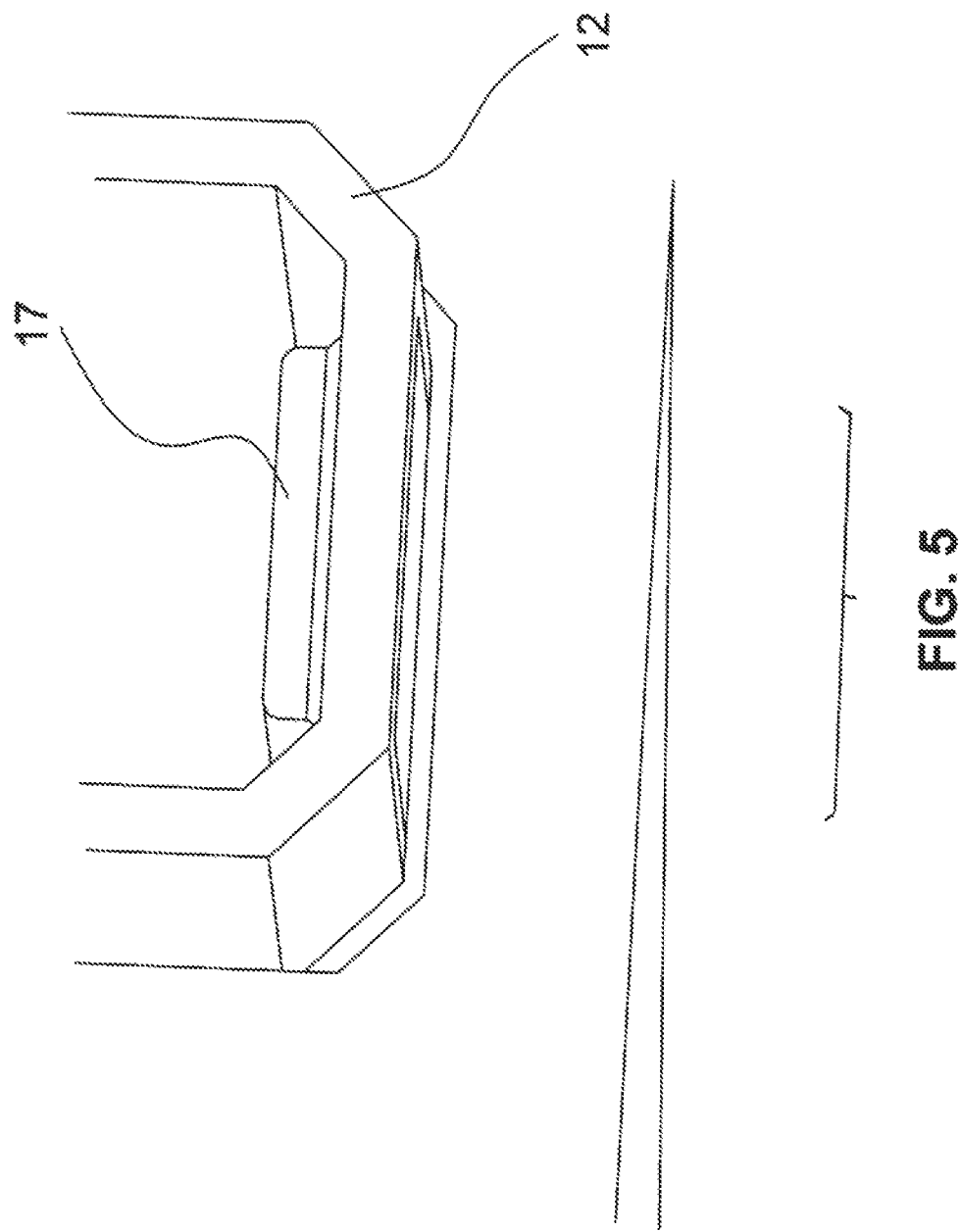
FIG. 5 is a close-up view of the lock's plug head 12 wherein the hook 17 is withdrawn into the plug head to release the thunderbolt slot of a laptop (not shown).

Referring to FIG. 3, there is disclosed an isometric view of the lock 10 of the present invention. FIG. 3 shows the exterior appearance of the lock 10 which has 3 code disks 13, each has 12 letters code. The number of code on each disk shown in the figure is for example only and can be varied. The lock 10 has a lock housing 11 which is rectangle in general for enclosing a locking mechanism inside and a thunderbolt plug head 12 for plugging into the thunderbolt slot of a computer to secure the computer to an immovable object such as a desk or chair. The retractable case 30 is in a ring shape with a hole 31 in the center which is larger than the width of the lock head 10. In use, the user can pull the cable and lock head out of the lock retractable case and use them to surround an immovable object and then insert the lock head 10 and the cable 20 through the central hole 31 in the retractable case 30 to form a loop. On two sides of the lock's housing 11 there are two buttons 112 for releasing the lock's plug head 12 from the computer's thunderbolt slot. FIG. 4 is another isometric view of the lock 10 of the present invention wherein a hook 17 is shown projected out of the plug head 12 to hook up with the thunderbolt slot of a laptop (not shown). When the hook 17 is projected out of the plug head 12, the hook locks the thunderbolt slot of a computer. When the hook 17 is withdrawn into the plug head 12 as shown in FIG. 5, the thunderbolt slot (not shown) is released and unlocked.

Figure 6:
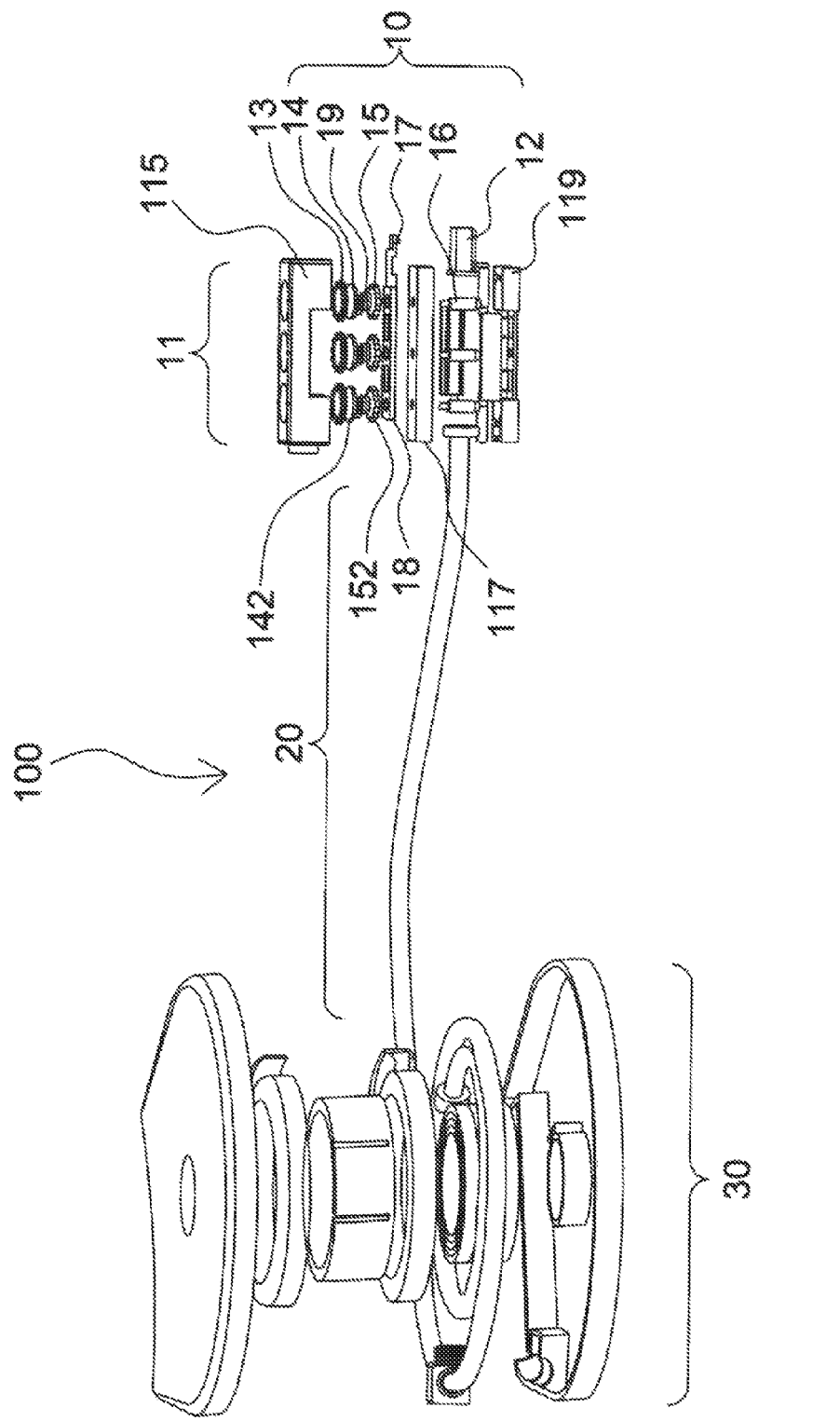
FIG. 6 is an exploded perspective view of the lock assembly 100.
Figure 7:
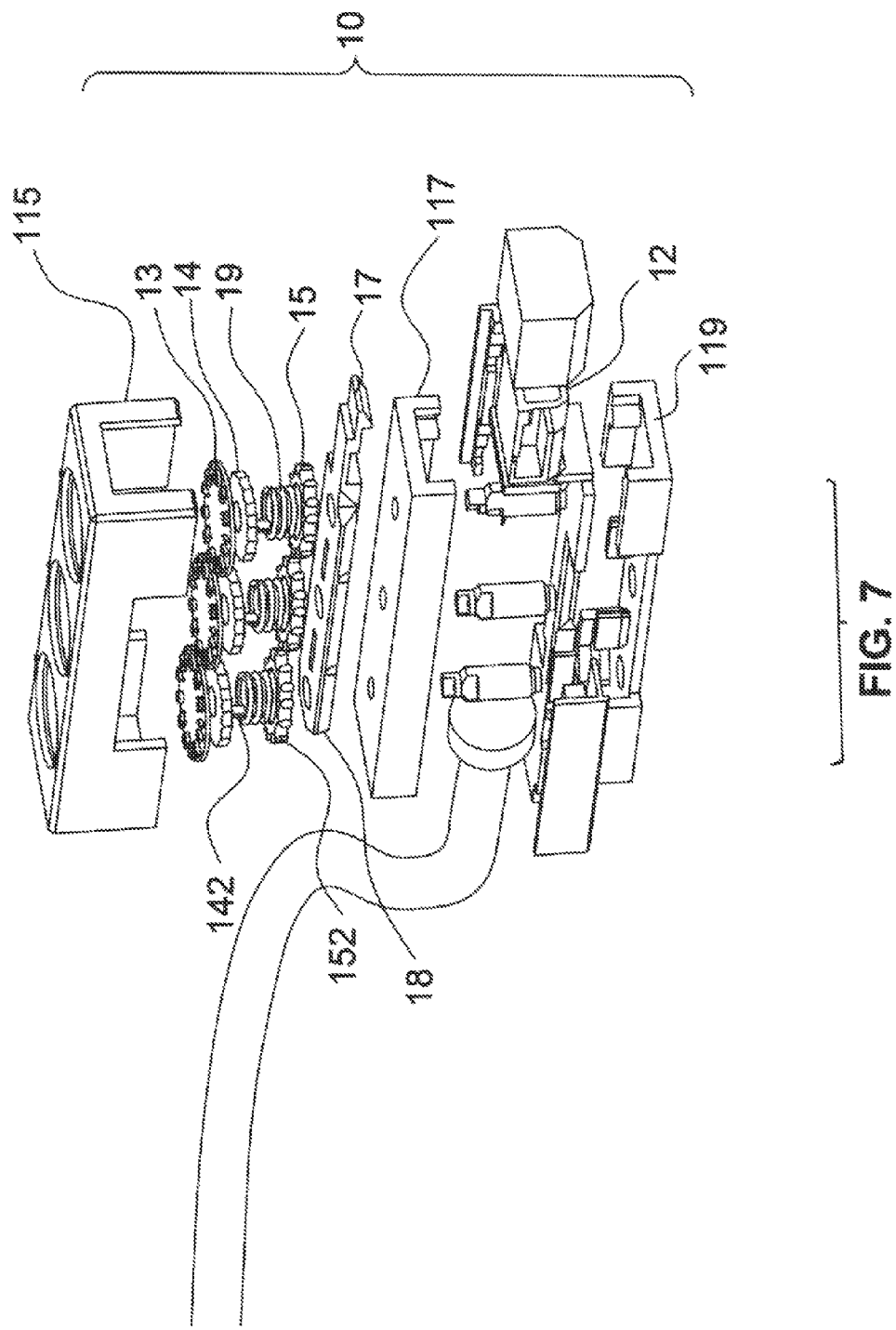
FIG. 7 is an exploded perspective view of the lock head 10.

Referring to FIGS. 6-7, there is disclosed an exploded view of the lock head 10 of the lock assembly 100 according to the present invention. Within the lock housing 11, the locking mechanism of the lock 10 has three code disks 13; each one has 12 letters as its code. The number on the code disk 13 can vary and won't affect the principle of the present invention. There are two gears (upper gear 14 and lower gear 15) inside the lock housing 11 corresponding to each code disk 13. The code disk 13 and two gears 14, 15 share the same axle 16; there are totally three axles 16, one for each set of code disk 13 and two gears 14, 15. As shown in the figures, each upper gear 14 is located beneath and connected to its corresponding code disk 13 and each lower gear 15 lies beneath its corresponding upper gear 14 but is not connected to the upper gear 14. Between each upper gear 14 and lower gear 15, there exists a spring 19. When the lock 10 is at an unlocked position, the springs 19 will be compressed and when the lock 10 is at a locked position, the springs 19 will be uncompressed.

The axle 16 attaches firmly to the upper gear 14 therefore code disk 13 and upper gear 14 will turn at the same pace with axle 16. In one embodiment, the upper gear 14 has 12 teeth, on the inner side of the outer case 115. There is a clipper that can clip one of the 12 teeth of the upper gear 14. This enables the upper gear 14, the axle 16, and the code disk 13 to turn to one of the 12 position at the same pace. This mechanism (teeth and clipper) is used to lock the code disk 13 and upper gear 14 to make them turn with the axle 16. However, the lower gear 15 will not turn with the axle 16 without additional mechanism.

The upper gear 14 has a protrusion 142 that can be turned to one of twelve positions; the lower gear 15 has a corresponding indentation 152 which can be set to one of twelve positions too. The upper gear 14 is connected to the code disk 13 but the lower gear 15 is not connected to the upper gear 14. As a result, while one code disk 13 turns and drives its axle 16, the upper gear 14 turns accordingly but the lower gear 15 will not turn accordingly. Only when the protrusion 142 of the upper gear 14 turns to the same position with the indentation 152 on the lower gear 15, the protrusion 142 can insert into the indentation 152 and the lower gear 15 can be moved upward. Once the protrusion 142 is inserted into the indentation 152, the lower gear 15 can then move together with the upper gear 14 and the code disk 13. This mechanism enables custom code combination which will be discussed later.

The hook 17 that can be hooked up to the frame of a laptop is connected to a lifting plate 18. The plate 18 is located inside the inner case and beneath the lower gears 15 and has holes for the three axles 16 to pass through. If a user wants to unlock the lock from the laptop, the plate 18 needs to be moved up first in order to lift up the hook 17 to unhook the computer frame. The lifting plate 18 can be moved up by pushing the lock's side button 112. The contact surface of the side buttons 112 with the lifting plate are slanted in respect with one another. So when the correct cipher is inputted and the side buttons 112 are pushed, a force is exerted, causing the lifting plate 18 to slide upward against the slant contact surface of the side buttons 112. However, when the protrusions 142 are not lined up with the holes 152, the lifting plate 18 cannot be lifted. Only when the input codes are correct on all three code disks, the combination of all three protrusions 142 on the upper gears 14 and holes 152 on the lower gears 15 are lined up; the lifting plate 18 can be moved up by pushing the lock's side button 112, and then the hook 17 can be lifted up to unlock the laptop.

The locking mechanism is also designed to enable custom code combination. As mentioned in the foregoing, when the user inputs the correct combination, the protrusions 142 are lined up with the indentations 152; all 3 lower gears 15 can be moved up. The user can push the side button 112 to lift up the lifting plate 18 and all three lower gears 15. In this case the three lower gears 15 can be moved up, with the protrusions 142 inserted into the indentations 152, and locked up with all upper gears 14. In this case, when the user turns the code disk 13, the lower gear 15 turns with the code disk 13 and upper gear 14 and thus, the location of the indentation 152 is changed which means the combination is changed and set to new position. The side button 112 can then be released and the lock 10 now has a brand new cipher.

Figure 8:
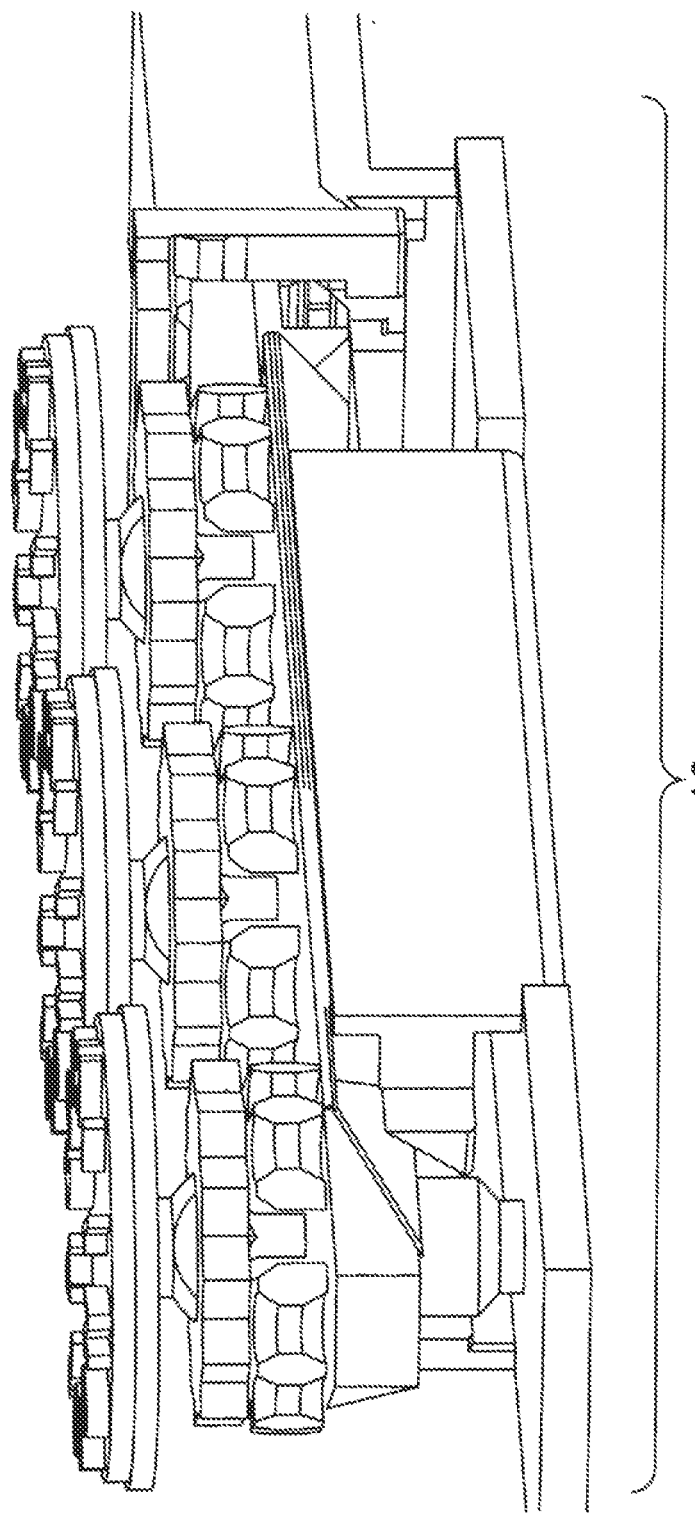
FIG. 8 is a perspective view of the lock head 10 at an unlocked position.

FIG. 8 shows the lock 10 of the present invention at an unlocked position where the protrusions 142 on the upper gears 14 is inserted into the indentations 152 on the lower gears 15, the lock's side button 112 is pushed in to lift up the lifting plate 18, the springs 19 (not observable) are pressed, and the hook 17 is lifted up to unlock the computer (not shown). Refer back to FIG. 5 for a close-up view of the hook 17 which is withdrawn into the plug head 12.

Figure 9:
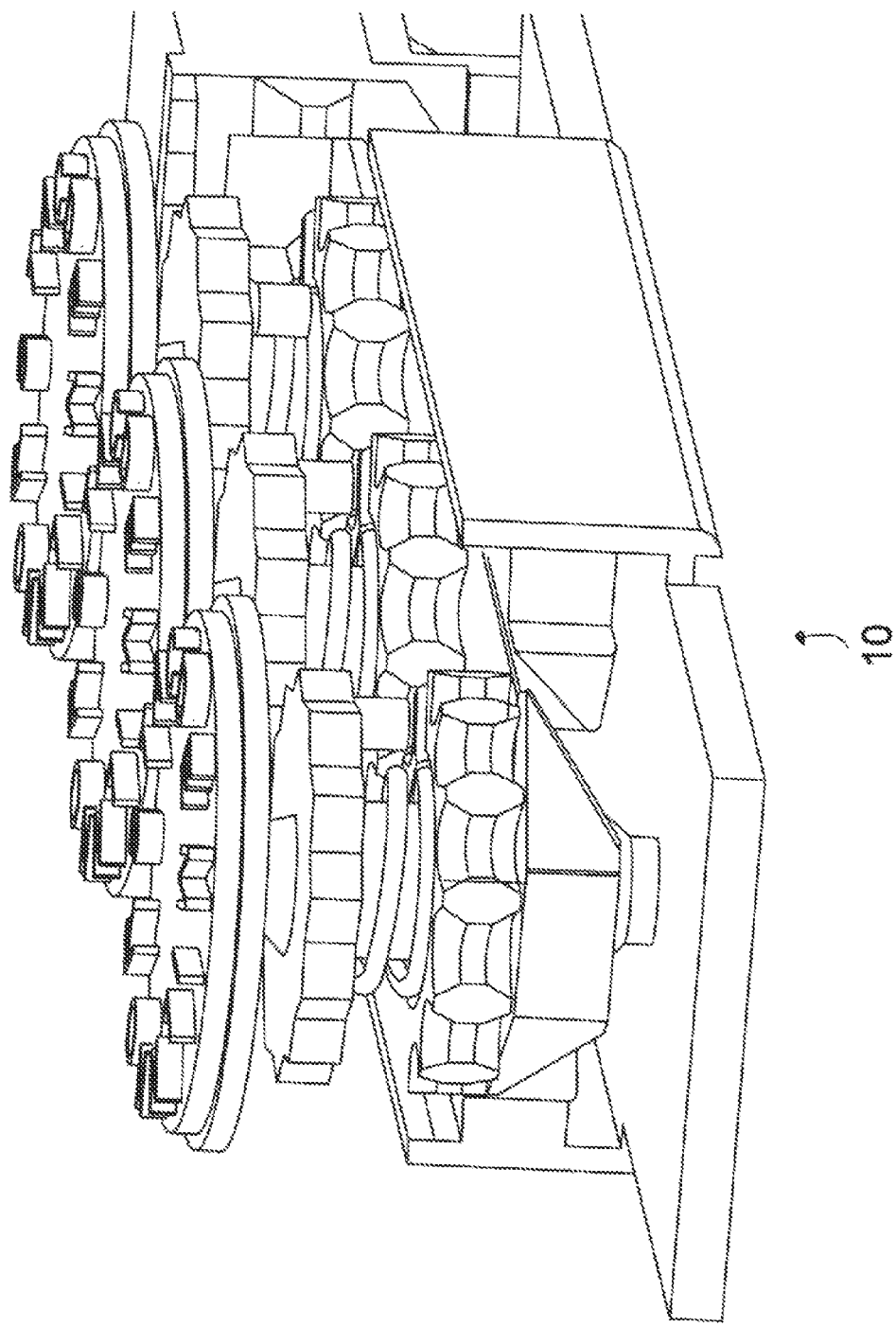
FIG. 9 is a perspective view of the lock head 10 at a locked position.
Figure 10:
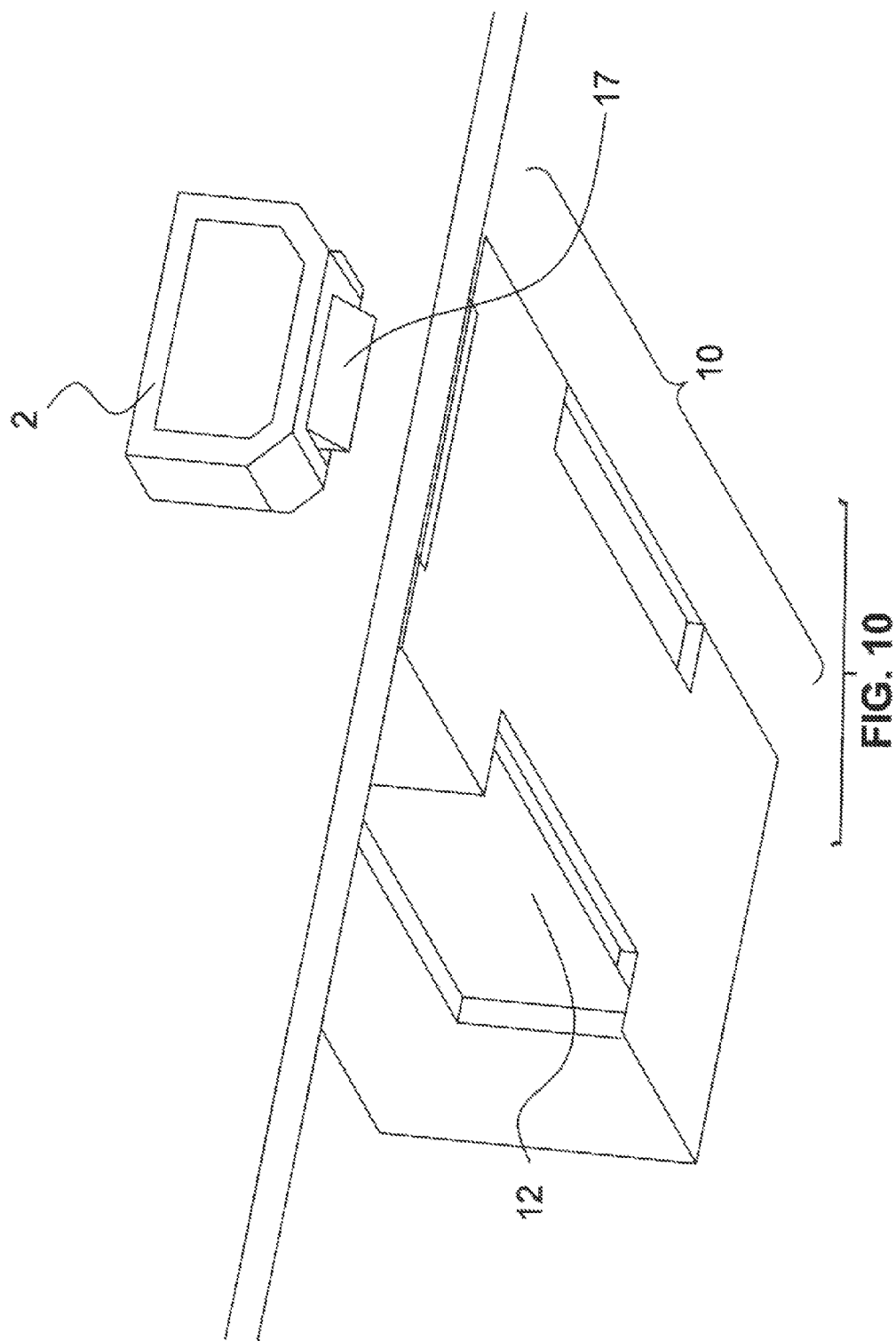
FIG. 10 is a perspective view of the lock head 10 at a locked position wherein the hook 17 is projected out of the plug head 12 and locked into the frame of the laptop.

FIG. 9 shows the lock 10 of the present invention at a locked position where the protrusions on the upper gears 14 are not inserted into the indentations on the lower gears 15, the lock's side button 112 is released, the springs 19 are relaxed, the lifting plate 18 cannot be lifted and the hook 17 is pressed down to lock the laptop (not shown). Referring to FIG. 4 for a plug head with the hook projected out of the plug head 12 and FIG. 10 for the hook 17 projected out of the plug head 12 and locked into the frame of the laptop 200.

The thunderbolt plug head 12 of the present invention is designed specifically for locking the laptop. A hook 17 coming from the body of the lock head 10 can be hooked up to the frame of laptop. When the user inputs the correct cipher, the side button 112 can be pushed to lift up the hook 17 and draw it back into the plug head 12. The plug head 12 therefore can be released from the laptop.

Figure 11:
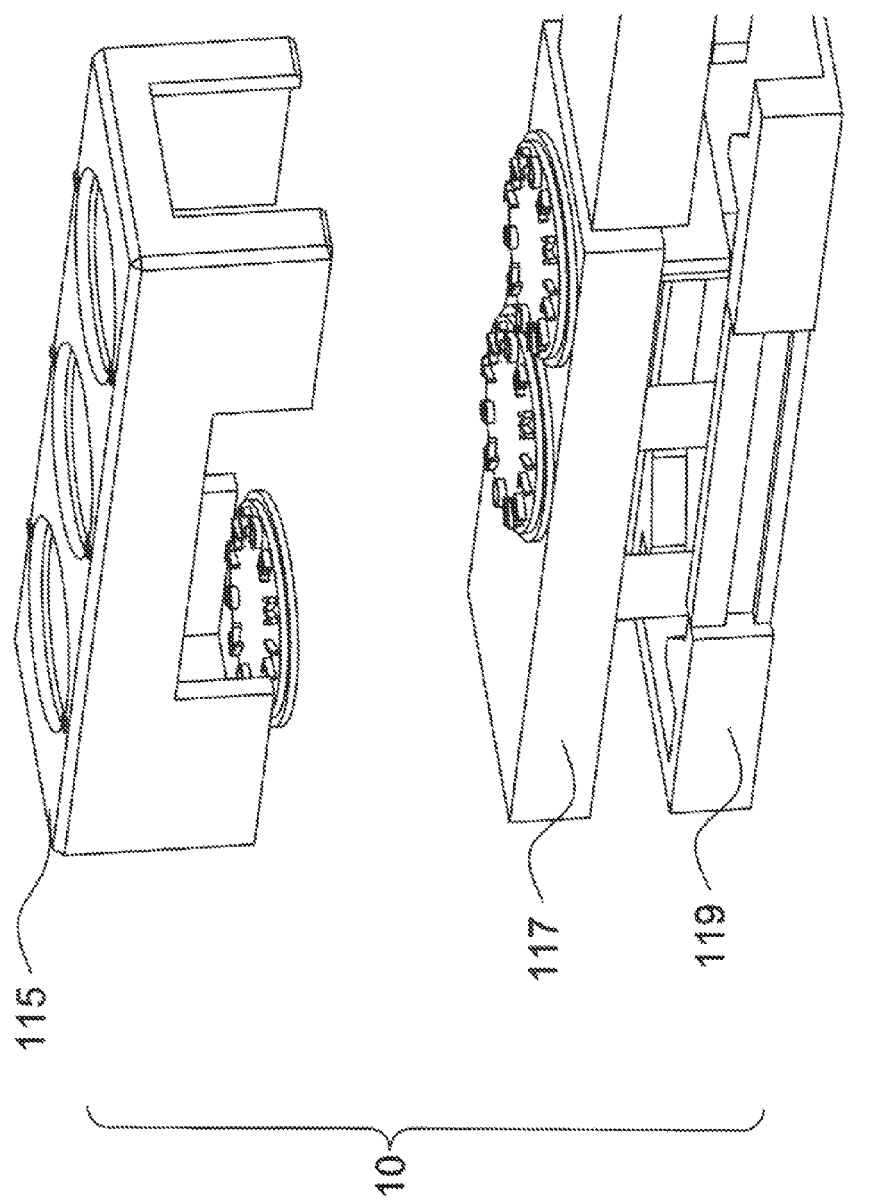
FIG. 11 is a perspective view of a half-assembled lock head 10.

Referring to FIG. 11 for a half-assembled lock head 10 according to one embodiment wherein the outer case 115 is made of polished plastics for decoration and secure the code disk on the top surface of the outer case. The inner case 117 is made of steel and will be bundled permanently with the lower case 119 after assembly to prevent thief from breaking apart the lock.

Figure 12:
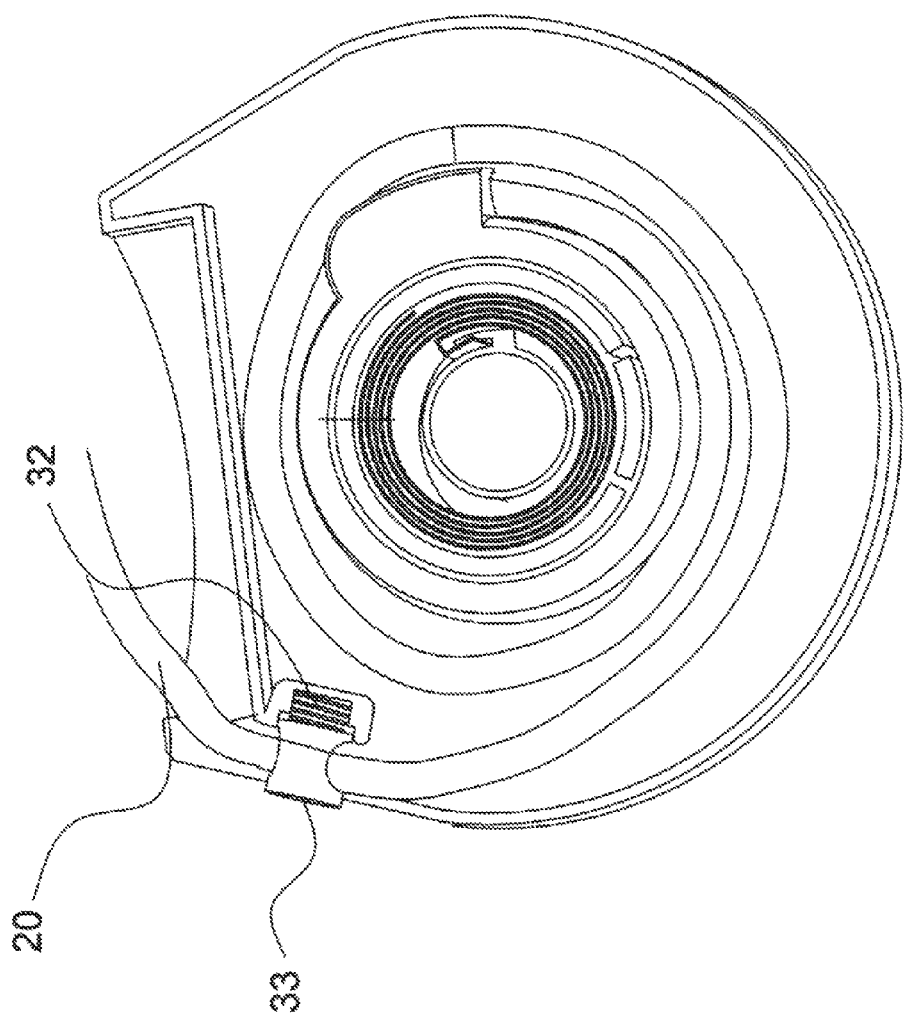
FIG. 12 is a cross-sectional view of the case 30 for stowing and carrying the lock head 10.

The specially designed case 30 as shown in FIGS. 1, 2 and 12 can retract back all the cable 20 and can provide storage for the lock head 10. The retracted lock 100 is slim and beautiful. The principle of the case 30 is similar to a roll up measuring tape, but with new design for beauty and convenience. When the cable is pulled out, the retractable coil spring 32 stores the energy while the stopper 33 makes sure the cable won't retract back (FIG. 12). If the user presses the stopper button 34 (FIG. 2), the stopper 33 is released and the cable 20 is free and retracts back into the case 30.

In another embodiment, the lock assembly 100 of the present invention is designed to plug into a USB port or HDMI port of Macbook Pro with Retina display's and Macbook Air laptop series to lock the computer rather than using thunderbolt port.

In the preferred embodiment disclosed in the figures, the three code disks are lined up to make up the combination lock. However, other numbers of code disk may also be used and placed in different way in other embodiments. In the preferred embodiment disclosed in the figures, 12 codes are put on each code disk but the number of codes on each disk can also vary.

This locking mechanism can also be used to design a better laptop lock for normal laptop with Kensington Lock slot. The lock assembly 100 including the lock head 10, retractable cable 20 and case with retractable mechanism 30 according to the present invention can also be used to lock a regular laptop with Kensington lock slot.

The lock parts are made with either stainless steel or plastic. Detailed materials used are shown in attached images.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A retractable cable combination lock assembly for laptop computers comprising:
    a combination lock having a hook that can be hooked up to the frame of a computer via a built-in hole including a thunderbolt slot, USB port, or HDMI port in the frame of the computer and a combination locking mechanism, said combination locking mechanism comprising:
    a plurality of code disks, each of said code disks having a plurality of codes;
    a plurality of upper gears, each of said upper gears located beneath and connected to one corresponding said code disk, each said upper gear has one protrusion which can be set to a plurality of positions;
    a plurality of lower gears, each of said lower gears located beneath one corresponding said upper gear, each said lower gear has one indentation which can be set to a plurality of positions;
    a plurality of springs, each of said spring located between and connected to each said lower gear and its corresponding said upper gear;
    a plurality of axles, each axle channeling through the center of each said lower gear and its corresponding said upper gear;
    a lifting plate located beneath said lower gears having a plurality of holes for said axles to pass through;
    a hook connected to said lifting plate for hooking up to the frame of a laptop;
    an enclosure for enclosing said locking mechanism, said enclosure having a plurality of holes on its top, each hole receiving one of said code disks;
    a lock side button located on the sides of said enclosure, said lock side button when pushed causing said lifting plate to move upwards; and
    a plug head connected to one end of said enclosure for enclosing said hook and plugging into the thunderbolt slot or USB port or HDMI port of the laptop computer;
    wherein when all three protrusions on said upper gears lined up with said indentations on said lower gears said lower gears can be lifted up when said side button is pushed to move up said lifting plate and said hook so that the laptop computer can be unlocked;
    a retractable cable having one end securely connected to said lock and being used to secure the laptop to an immovable object; and
    a case with retractable mechanism for retracting, storing and carrying said retractable cable and lock, said cable having the other end attached to said case.

2. The retractable cable combination lock assembly of claim 1, wherein said hook and plug head are dimensioned and sized to fit the thunderbolt slot or USB port or HDMI port and said hook locks into the frame of the laptop computer via the slot or port.

3. The retractable cable combination lock assembly of claim 2, wherein said locking mechanism comprises three code disks, three upper gears, three lower gears, and three axles.

4. The retractable cable combination lock assembly of claim 2, wherein each said code disk has 12 codes, each said protrusion on said upper gear can be set to one of 12 locations and each said indentation on said lower gear can be set to one of 12 locations.

5. The retractable cable combination lock assembly of claim 2, wherein said locking mechanism is designed to enable custom code combination, when said protrusion is lined up with said indentation and said lower gear is moved upwards, said lower gear turns with the turn of said code disk to reset the location of said indentation, once said side button is released said lock has a brand new cipher.

\* \* \* \* \*